(12) United States Patent
Gassmann et al.

(10) Patent No.: US 7,713,158 B2
(45) Date of Patent: May 11, 2010

(54) TRANSFER BOX WITH CROWN TEETH

(75) Inventors: Theodor Gassmann, Siegburg (DE); Heinzwilli Fuchs, Mühleip (DE)

(73) Assignee: GKN Driveline International GmbH, Lohmar (DE)

( * ) Notice: Subject to any disclaimer, the term of this patent is extended or adjusted under 35 U.S.C. 154(b) by 811 days.

(21) Appl. No.: 10/579,083

(22) PCT Filed: Oct. 27, 2004

(86) PCT No.: PCT/EP2004/012121

§ 371 (c)(1),
(2), (4) Date: Dec. 20, 2006

(87) PCT Pub. No.: WO2005/047043

PCT Pub. Date: May 26, 2005

(65) Prior Publication Data

US 2007/0099740 A1    May 3, 2007

(30) Foreign Application Priority Data

Nov. 15, 2003   (DE) ................. 103 53 415

(51) Int. Cl.
*F16H 37/02*   (2006.01)
*F16H 48/06*   (2006.01)

(52) U.S. Cl. .................. 475/213; 475/249; 475/230

(58) Field of Classification Search ................. 475/201, 475/210, 213, 230, 231, 248, 249; 74/665 F, 74/665 G, 665 GA See application file for complete search history.

(56) References Cited

U.S. PATENT DOCUMENTS

| 2,228,581 | A | | 1/1941 | Olen |
| 2,270,567 | A | | 1/1942 | Slider |
| 2,313,183 | A | * | 3/1943 | Trbojevich .................. 475/336 |
| 2,774,253 | A | | 12/1956 | Minard et al. |
| 3,090,254 | A | | 5/1963 | Stump |
| 3,505,904 | A | | 4/1970 | Williams, Jr. |
| 3,550,724 | A | | 12/1970 | Vollmer |
| 3,916,728 | A | * | 11/1975 | Behar et al. .................. 475/231 |
| 5,271,479 | A | * | 12/1993 | Kuwahara et al. ........... 180/249 |
| 5,302,158 | A | * | 4/1994 | Kwasniewski ............... 475/160 |
| 6,402,655 | B1 | * | 6/2002 | Irwin et al. ................. 475/231 |
| 6,605,015 | B1 | * | 8/2003 | Kinsley et al. ................ 475/86 |
| 6,702,703 | B2 | | 3/2004 | Gervais, III et al. |
| 6,811,511 | B2 | | 11/2004 | Zeise |

* cited by examiner

*Primary Examiner*—Roger Pang
(74) *Attorney, Agent, or Firm*—Rader, Fishman & Graue PLLC

(57) ABSTRACT

A transfer box with a housing, an input shaft, a first output shaft extending coaxially relative to said input shaft, and a second output shaft extending parallel to said two shafts, as well as with a differential gear assembly arranged between said shafts, wherein the input shaft carries a cross member with a plurality of radial bearing arms for the differential gears, wherein a first side gear is connected in a rotationally fast way to the first output shaft and wherein a second side gear is rotatably supported on the input shaft and drives the second output shaft, wherein the differential gears are spur gears and the side gears crown gears and wherein the teeth of the differential gears engage the teeth of the side gears.

11 Claims, 4 Drawing Sheets

TRANSFER BOX WITH CROWN TEETH

TECHNICAL FIELD

The invention relates to a transfer box with a housing, an input shaft, a first output shaft extending coaxially relative to said input shaft, and a second output shaft extending parallel to said first output shaft and said input shaft, as well as with a differential gear assembly arranged between said shafts.

BACKGROUND

In vehicles with two permanently driven axles, transfer boxes of said type, on the one hand, serve to drive a rear axle through a first output shaft and, on the other hand, they serve to drive a front axle through a second output shaft which, as a rule, is offset relative to and extends parallel relative to the input shaft. The torque can be uniformly distributed between the output shafts by the differential gear assembly or a biased torque load can be applied to one of the output shafts.

The torque distribution in transfer boxes of this type is commonly effected by planetary gear differential assemblies for dividing the torque between the front axle and the rear axle; they are characterised by a large number of parts, complicated assembly procedures and by this high costs, more particularly if they are provided in the form of double planetary differentials to achieve a uniform torque distribution.

SUMMARY OF THE INVENTION

It is therefore an object of the present invention to provide a transfer box with a differential gear assembly in a simplified design. A transfer box of the type mentioned is disclosed wherein the input shaft carries a spider member with a plurality of radial bearing arms for the differential gears, wherein a first side gear is connected to the first output shaft in a rotationally fast way and wherein a second side gear is rotatably supported on the input shaft, which second side gear drives the second output shaft, wherein the differential gears are spur gears and the side gears are crown gears, with the teeth of the differential gears engaging the teeth of the side gears.

The differential gears supported with radial axes between the side gears are directly supported on the input shaft, which results in a very small number of parts. The torque is introduced directly via the input shaft and the radial arms into the differential gear assembly. Generally speaking, a differential carrier carrying the differential gears is eliminated in this case.

According to a particularly advantageous embodiment, a gearwheel or sprocket wheel for driving the second output shaft via a gearwheel stage or chain drive is integrally connected to the second side gear. Again, the number of parts is reduced.

According to a further advantageous embodiment, the input shaft and the first output shaft are each singly supported in the housing and that the input shaft is supported by a journal projection in a countersunk end portion in the first output shaft, more particularly by a needle bearing.

According to a first embodiment, in respect of the axial forces generated by the tooth forces in the direction of the shafts, the side gears are supported in the housing by the bearings of the input shaft and of the first output shaft. More particularly, outwardly directed axial forces have to be accommodated by the housing. The tooth play can be set by selecting suitable discs which are placed underneath at least one of the side gears.

According to a second embodiment it is possible for the side gears to support each other axially, with a carrier being connected to one side gear which carrier extends over the other side gear and via which the other side gear is axially supported on the first mentioned side gear. An axial bearing or friction discs can be provided between the carrier and the outside of the second side gear. An axial bearing generates the effect of an open differential, whereas the friction discs can generate a friction moment which inhibits the differential effect. The axial forces generated by the tooth forces are compensated for as inner forces via the carrier. The tooth play can be set by using discs at the axial bearing or by accurately positioning the carrier on the other sideshaft gear prior to connecting the two parts to one another. The element referred to as a carrier in this context and serving to support the two side gears relative to one another can be cost-effectively produced in the form of a deep-drawn metal part.

According to a further embodiment, for the purpose of a non-uniform torque distribution between the output shafts, the side gears comprise different rolling circle radii.

Due to the crown gear teeth design, it is possible to vary the torque distribution between the output shafts and thus between the driving axles simply by exchanging the side gear teeth while otherwise leaving the design unchanged. This is due to the fact that the crown gear teeth are insensitive to the axial positioning of the spur gears in rolling contact with the crown gears, with reference to the axis of the spur gears.

The above-described invention provides a simple differential assembly wherein drive is effected from the center via the carrier spider member of the differential gears. The axial forces acting on the side gears can be supported directly on the housing if a carrier in the conventional sense has not been provided.

BRIEF DESCRIPTION OF THE DRAWINGS

Preferred embodiments of the invention are illustrated in the drawings and will be described below.

DETAILED DESCRIPTION

Figure 1:
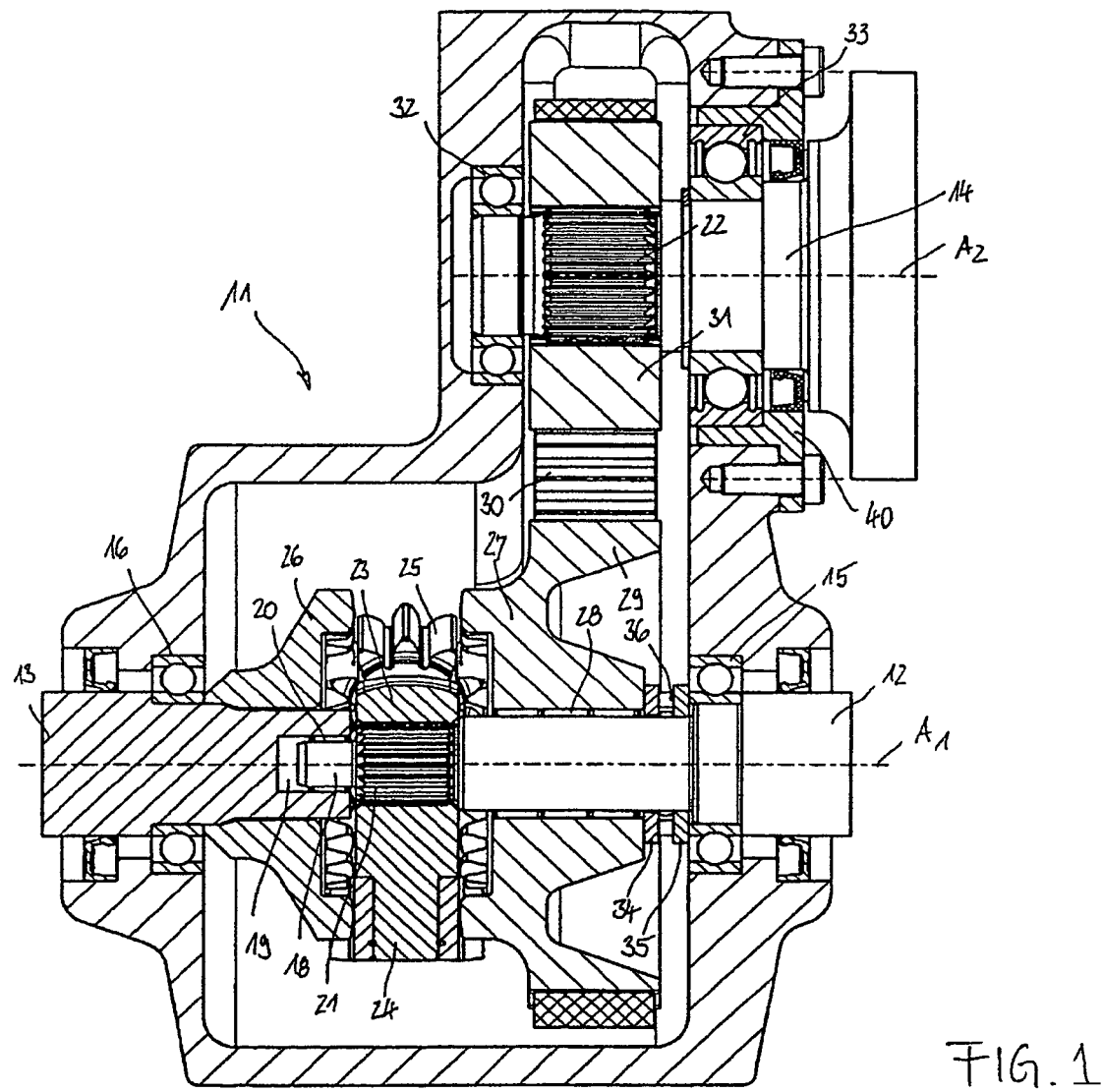
FIG. 1 shows an inventive transfer box in a section through the plane of he axes in a first embodiment.
Figure 2:
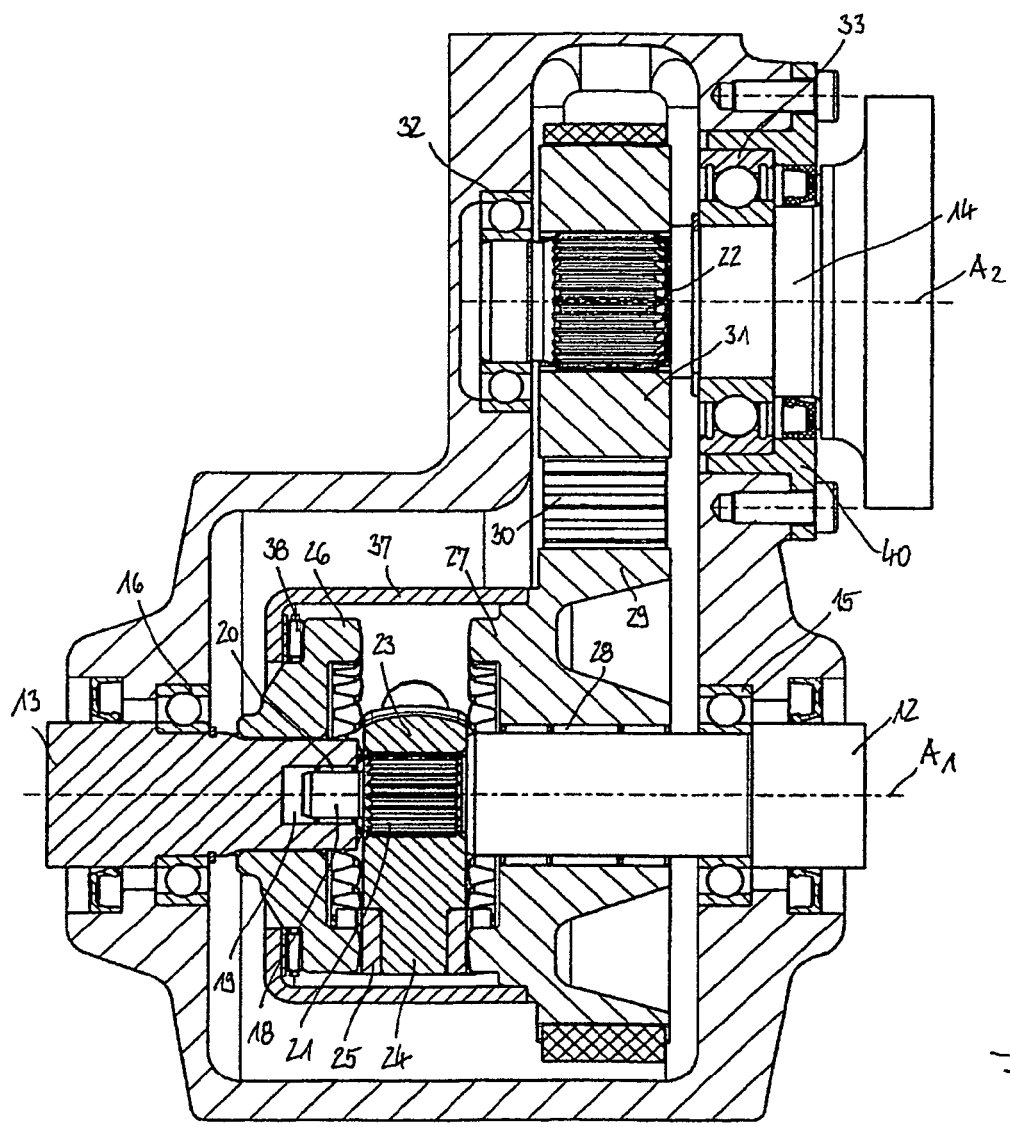
FIG. 2 shows an inventive transfer box in a section through the plane of the axes in a second embodiment.
Figure 3:
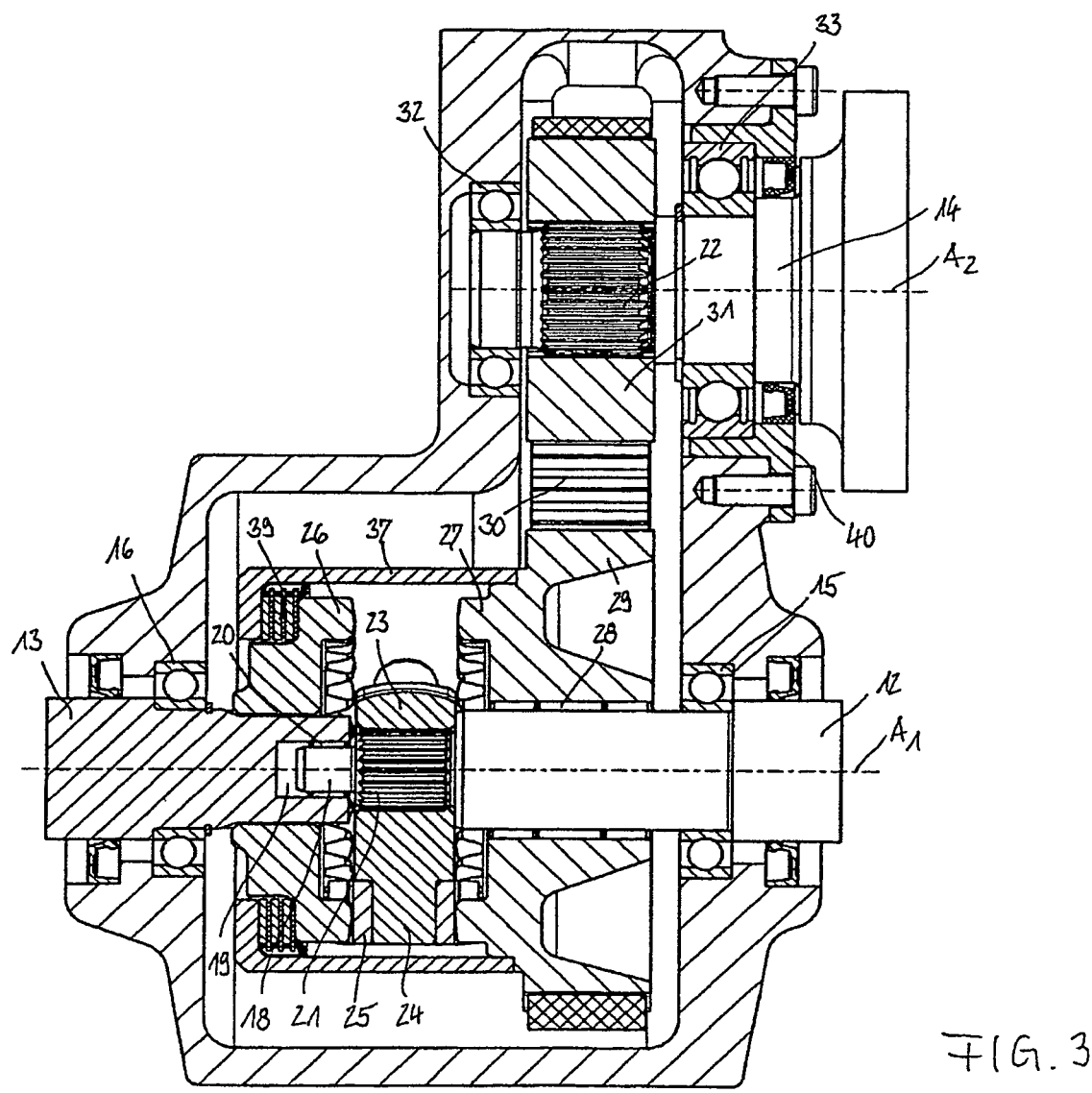
FIG. 3 shows an inventive transfer box in a section through a plane of the axes in a third embodiment.

FIGS. 1 to 3 will initially be described jointly to the extent that their respective designs correspond to one another.

They each show an inventive transfer box whose housing 11 is shown in principle only and which can be divided in the drawing plane for example. An input shaft 12 and a first output shaft 13 are arranged coaxially relative to one another on a first axis Al. A second output shaft 14 is rotatably arranged on a second axis A2 which extends parallel to the axis Al. The input shaft 12 is supported via a ball bearing 15 in a second housing aperture. A journal projection 18 engaging a central recess 19 in the first output shaft 13 is provided at the input shaft 12, with the journal projection 18 being supported via a needle bearing 20 in the recess 19. The input shaft 12 comprises shaft teeth 21 which adjoin the journal projection 18 and on to which there is slid a spider member 23 which comprises corresponding inner teeth and which is provided with three circumferentially distributed radial bearing arms 24. The bearing arms carry differential gears 25 provided in the form of spur gears. The spur gears 25 engage a first side gear 26 which is slid on to the first output shaft 13 and which is connected thereto in a rotationally fast way, as well as a second side gear 27 which is slid on to the input shaft 12 and rotatably supported thereon via needle bearings 28. The second sideshaft gear 27 is integrally produced with a chain gear 29 which, via a chain 30, drives the second output shaft 14. The chain 30 directly engages the chain gear 31 which, by corresponding inner teeth, is slid on to the shaft teeth 22 of the second output shaft 14. The second output shaft 14 is supported in the housing 11 via bearings 32, 33 which are held by a cover 40.

In FIG. 1, the second sideshaft gear 27 is supported by the gear 29 via discs 34, 35 and a second axial bearing 36 on the bearing 15, with the bearings being such that at least outwardly directed axial forces can be accommodated by the bearings. The play in the inter-engaging teeth of the differential gears 25 and the sideshaft gears 26, 27 can be set by selecting the discs. The bearings of the first output shaft 13, too, have to be designed in such a way that at least the axial forces acting outwardly on the shaft can be supported by said bearings.

FIG. 2, instead of showing the assembly made of discs 34, 35 and axial bearings 36 for supporting the first sideshaft gear 27, shows an assembly made of a dish-shaped carrier 37 and a needle bearing 38 for axially supporting the second sideshaft gears 27 towards the outside. Said carrier 37 is firmly connected to the second sideshaft gear 27 and extends over the first sideshaft gear 26 in such a way that a needle bearing 38 inserted between the carrier 37 and the outside of the first sideshaft gear 27 accommodates the axial forces acting between the first sideshaft gear 26 and the second sideshaft gear 27. The bearings 15, 16 are substantially load-relieved as regards the outwardly acting axial forces.

FIG. 3, instead of the above-mentioned needle bearing 38, shows a friction disc assembly 39 inserted between the carrier 37 and the outside of the first sideshaft gear 26. Like the needle bearing, the friction disc assembly 39 accommodates the axial forces acting between the first sideshaft gear 26 and the second sideshaft gear 27, but it generates a friction moment when the sideshaft gears 26, 27 rotate relative to one another. As a result, a locking moment, which increases with increasing tooth forces, is built up in the differential gear assembly. The tooth forces themselves increase together with the torque introduced via the input shaft.

Figure 4:
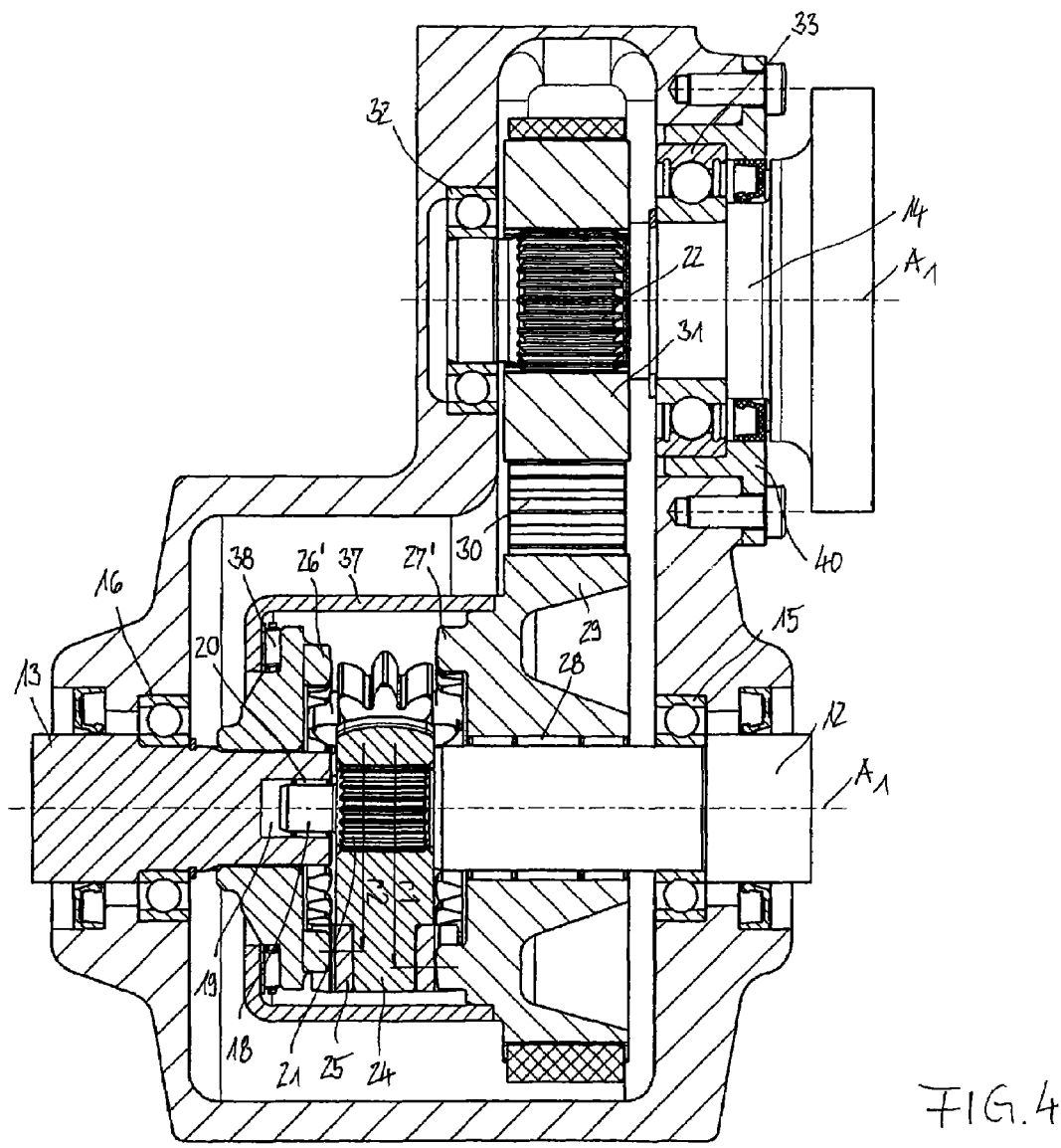
FIG. 4 shows an inventive transfer box in a section through the plane of the axes in a fourth embodiment.

FIG. 4 shows a differential drive in the same embodiment as illustrated in FIG. 2, but the side gears 26', 27' have different diameters, as a result of which the differential gears 25' comprise an increased axial tooth length. The side gears 26', 27' show the different rolling circle radii $r_1, r_2$. In this embodiment, the second output shaft 14 is subjected to a higher torque than the first output shaft 13.

LIST OF REFERENCE NUMBERS

11 housing
12 input shaft
13 first output shaft
14 second output shft
15 bearing
16 bearing
17 -
18 journal projection
19 countersunk portion
20 needle bearing
21 shaft teeth
22 shaft teeth
23 cross member
24 bearing arm
25 differential gear
26 first side gear
27 second side gear
28 needle bearing
29 chain gear
30 chain
31 chain gear
32 bearing (14)
33 bearing (14)
34 disc
35 disc
36 axial bearing
37 carrier
38 axial bearing
39 friction discs

The invention claimed is:

1. A transfer box comprising: a housing; an input shaft; a first output shaft extending coaxially relative to said input shaft; a second output shaft extending parallel to said first output shaft and said input shaft; and a differential gear assembly arranged between said input and first output shafts, wherein the input shaft carries a spider member with a plurality of radial bearing arms for the differential gears, wherein a first side gear is connected in a rotationally fast way to the first output shaft and wherein a second side gear is rotatably supported on the input shaft and drives the second output shaft, wherein the differential gears are spur gears and the side gears are crown gears and wherein the teeth of the differential gears engage the teeth of the side gears, wherein the first and second side gears are axially supported on one another, wherein a carrier is firmly connected to one of the first and second side gears and extends over the other one of the first and second side gears, wherein the first and second side gears are axially supported on one another via said carrier, and wherein between the carrier and the other one of the first and second side gears, there is arranged an axial bearing or friction discs for axial support.

2. A transfer box according to claim 1, wherein a gearwheel or sprocket wheel for driving the second output shaft via a gearwheel stage or chain drive is integrally connected to the second side gear.

3. A transfer box according to claim 1, wherein the input shaft and the first output shaft are each singly supported in the housing, and the input shaft is supported by a journal projection in a countersunk end portion of the first output shaft.

4. A transfer box according to claim 2, wherein the input shaft and the first output shaft are each singly supported in the housing, and the input shaft is supported by a journal projection in a countersunk end portion of the first output shaft.

5. A transfer box according to claim 1, wherein the side gears are axially outwardly supported in opposite directions in the housing via bearings of the input shaft and the first output shaft.

6. A transfer box according to claim 2, wherein the side gears are axially outwardly supported in opposite directions in the housing via bearings of the input shaft and the first output shaft.

7. A transfer box according to claim 3, wherein the side gears are axially outwardly supported in opposite directions in the housing via bearings of the input shaft and the first output shaft.

8. A transfer box according to claim 1, wherein the side gears comprise different rolling circle radii to provide a non-uniform torque distribution between the output shafts.

9. A transfer box according to claim 2, wherein the side gears comprise different rolling circle radii to provide a non-uniform torque distribution between the output shafts.

10. A transfer box according to claim 3, wherein the side gears comprise different rolling circle radii to provide a non-uniform torque distribution between the output shafts.

11. A transfer box according to claim 5, wherein the side gears comprise different rolling circle radii to provide a non-uniform torque distribution between the output shafts.

* * * * *